Sept. 29, 1953    E. ZECHER    2,653,484
COMPENSATING MECHANISM CONNECTING RECIPROCATING
MEMBER TO A ROTATING MEMBER
Filed Sept. 5, 1950    3 Sheets-Sheet 1
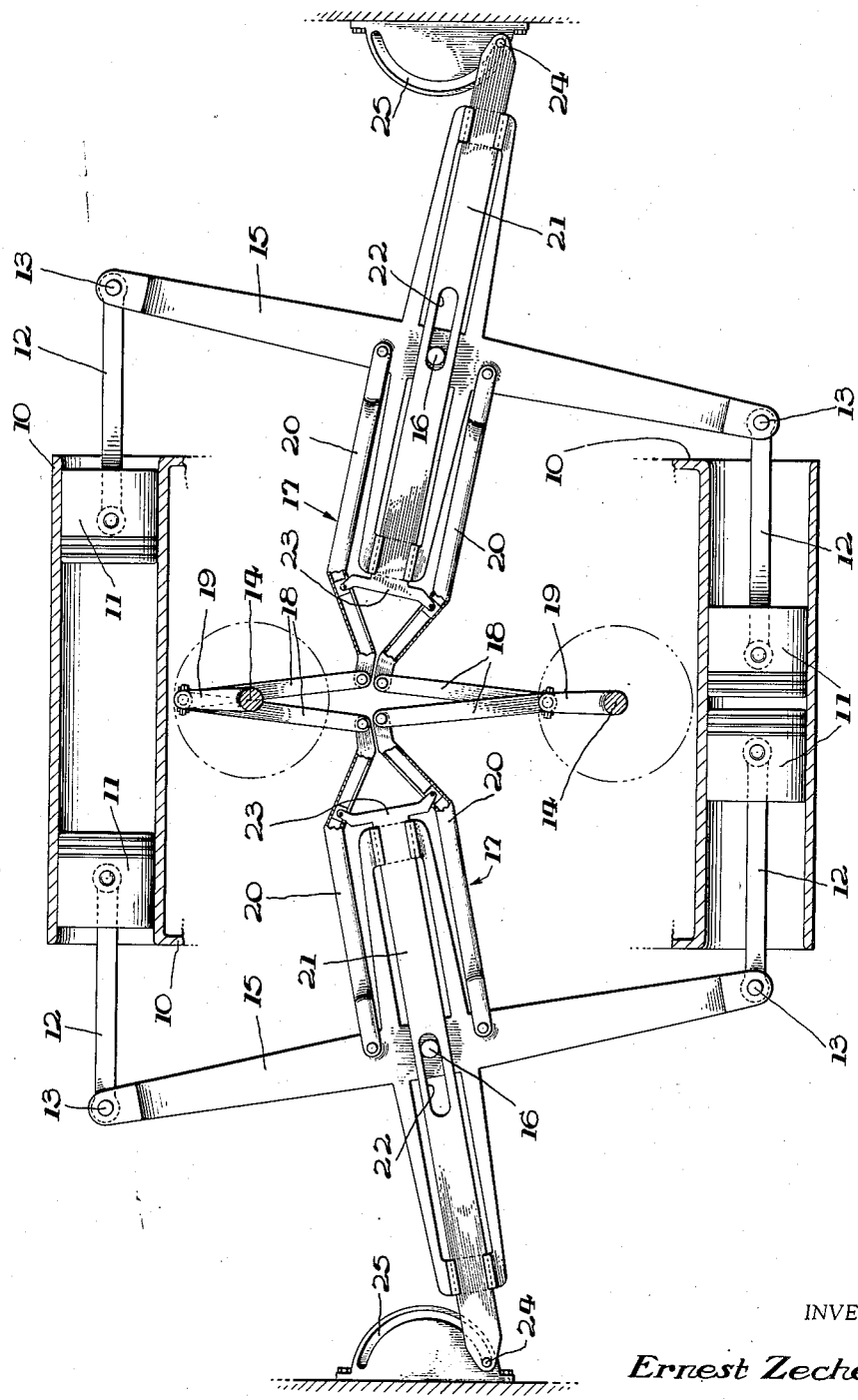
INVENTOR
*Ernest Zecher*
BY *Henry W. Bock*
AGENT

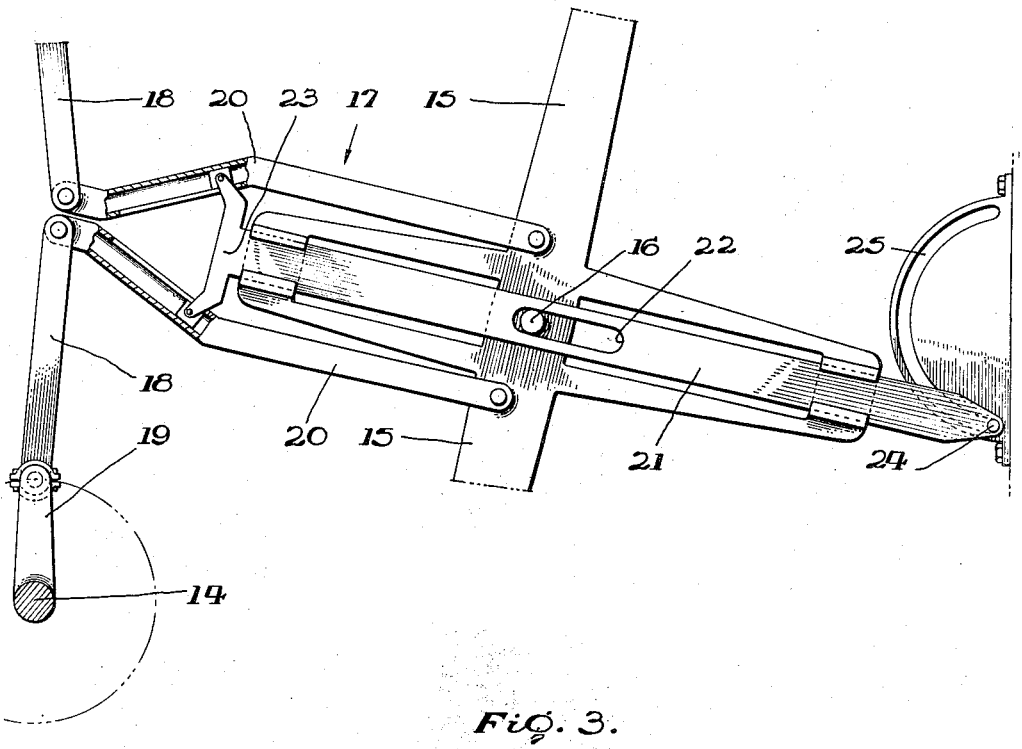
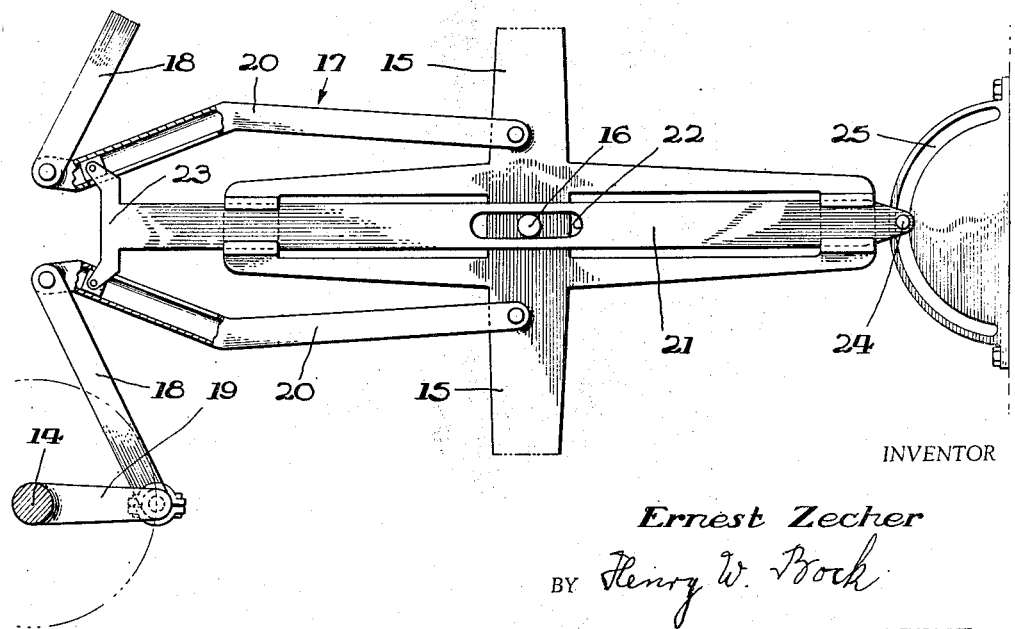

Sept. 29, 1953 E. ZECHER 2,653,484
COMPENSATING MECHANISM CONNECTING RECIPROCATING
MEMBER TO A ROTATING MEMBER
Filed Sept. 5, 1950 3 Sheets-Sheet 3
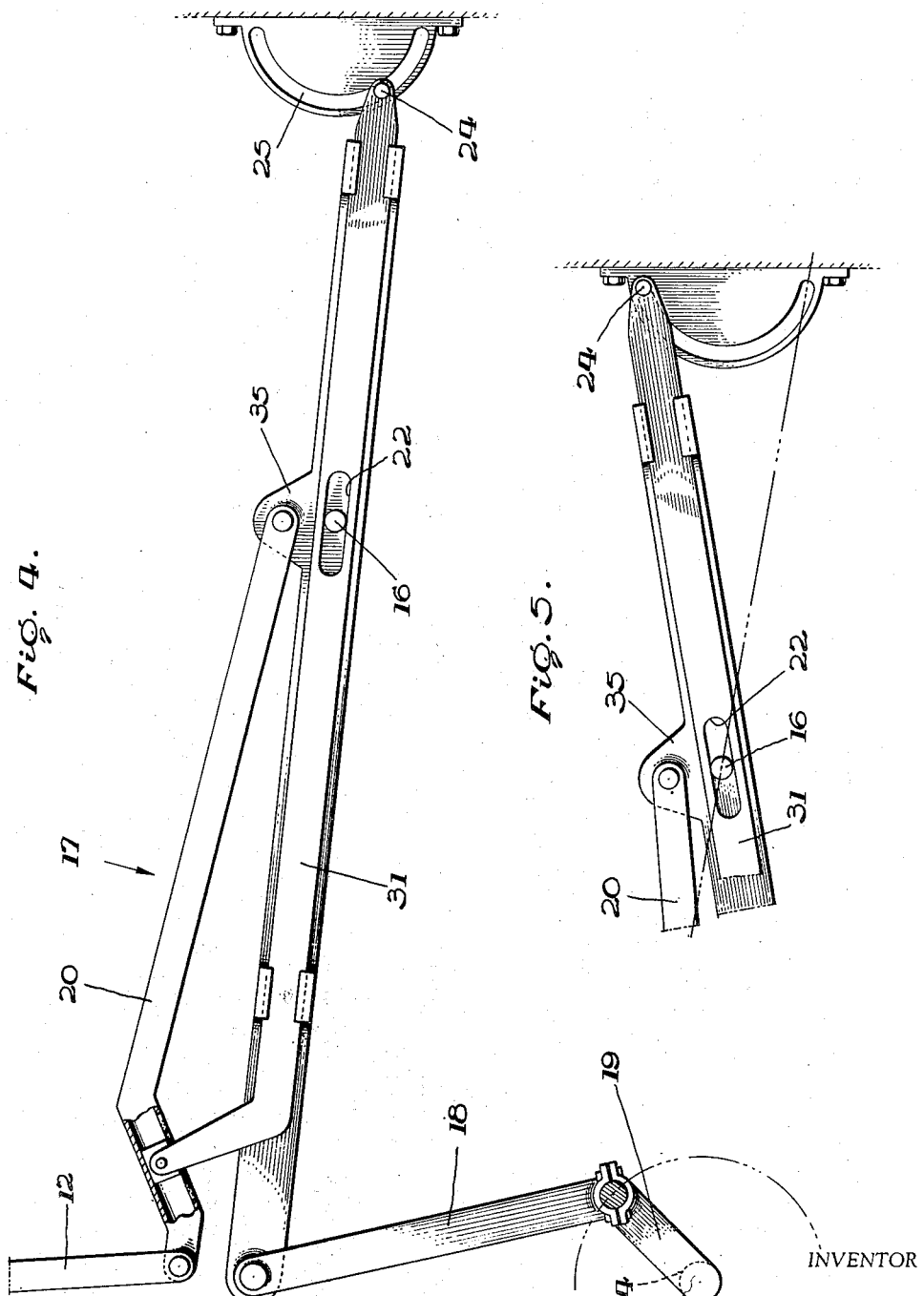
INVENTOR
Ernest Zecher
BY Henry W. Bock
AGENT

UNITED STATES PATENT OFFICE 2,653,484

COMPENSATING MECHANISM CONNECTING RECIPROCATING MEMBER TO A ROTATING MEMBER

Ernest Zecher, Middletown, Ohio

Application September 5, 1950, Serial No. 183,242

6 Claims. (Cl. 74—40)

This invention relates generally to the conversion of irregular reciprocating motion into uniform rotary motion, or by a like manner to convert uniform rotary motion into certain desired irregular reciprocating motion in an accurate and dependable manner with a minimum of moving parts.

In view of the fact that the single acting reciprocating piston type of engine operating by fluid pressure presents the greatest field for improvements of inherent defects by the application of the basic features of my equalizing mechanism, I shall endeavor to clearly present these conditions and also the manner in which I shall improve upon these defects.

With uniform crankshaft rotation maintained in relation to piston travel abruptly halted at the end of every piston stroke and promptly resumed with a reversal of direction, a very severe shock is imposed upon the bearings at both dead centers since the crank is not in position to yield to these impacts as the force is transmitted to the main crankshaft and no useful power is produced.

It is also obvious that the engine has a very low torque or turning power exerted upon the crankshaft until the crank has passed appproximately 20 degrees beyond dead center and the piston has receded a relatively lesser proportion of its stroke with very little power produced from the initial impact of the pressure exerted against the piston.

It is an established fact that the first quarter or 90 degrees of crank travel requires more than one half of the power stroke of the piston, the second quarter is completed with the remainder of less than one half of the power stroke, the third quarter is attained with less than one half of the return stroke, and the final quarter or 90 degrees requires the remaining more than one half to complete the return stroke and attain dead center.

This condition of variance or distortion of piston travel is directly due to the constantly changing of the degree of angularity of the connecting rod during the normal operation of the engine, and the range of variance or distortion is in direct relation to the ratio of the length of the connecting rod to the length of the piston stroke.

Connecting rods are generally within the range of two to two and one half (2 to 2½) times the length of the piston stroke.

The short connecting rod provides a greater torque or turning effect on the crank early in the power stroke and an excessive degree of angularity at 90 degrees off dead centers with a relatively greater variance or distortion of piston travel at certain periods during every complete revolution.

The longer connecting rod (2½ times the length of piston stroke) operates with relatively less variance or distortion of piston travel due to decreased angularity at 90 degrees off dead centers, with stresses and vibration reduced in a like manner and with less torque or turning effect upon the crank early in the power stroke.

Having cited these conditions that exist in the conventional type of engine having one piston in relation to each cylinder, it is apparent that in building an engine with opposed pistons that these adverse conditions present greater complications.

The specific object in designing this mechanism is to provide for the retention of the piston or pistons of an engine operating by fluid pressure at their top-most or forward position while the crank moves a certain desired distance beyond dead center, and by a carefully graduated means deliver the piston or pistons to the end of a normal stroke when the crank attains 180 degrees and is at the opposite dead center.

A second specific object is to utilize the greatest possible proportion of the piston travel of the power stroke during the period of greatest turning power when the crank is approaching and receding from 90 degrees off dead center, and relatively less of the piston travel when the crank is near dead centers.

A third specific object is to equalize the irregular piston travel during the four quarters of 90 degrees each of the complete revolution of the crankshaft and apply this equalizing mechanism to an engine having opposed pistons operating through the medium of balanced three arm rockers pivotally joined by connecting rods to two crankshafts, the two crankshafts geared in timed relation with a minimum of gearing.

A fourth and more general object is to provide a means of converting uniform rotary motion into accurately controlled irregular reciprocation for general use with a minimum of extra moving parts involved.

In the preceding paragraphs I have cited the various phases of the normal operation of reciprocating engines operating by fluid pressure and my objectives in correcting certain limitations by the application of my equalizing mechanism and also referred to its more general application.

With these objects in view and others which will become appparent as the invention is fully understood, the same resides in the construction, combination and arrangement of elements specifically hereinafter described and claimed in the subjoined claims.

The description is illustrated in the drawings forming part of the application and wherein:

Fig. 1 is a side elevation of the preferred embodiment of my invention;

Fig. 2 is an enlarged side detail elevation of the right-hand middle rocker arm with the levers thereof in closely adjacent position;

Fig. 3 is an elevation of the same arm with the levers thereof in substantially spaced position;

Fig. 4 is a side elevation of a modification of my invention;

Fig. 5 shows certain parts of Fig. 4 in another position.

In the drawing in which like characters of reference designate like or similar parts, Fig. 1 shows a pair of open-ended cylinders 10 in spaced and parallel relation and rigid with a frame (not shown). In either end portion of a cylinder is a piston 11 pivoted to a piston rod 12 in turn pivoted to the end of one of two rigid collinear arms 15, constituting parts of a rocker 17 fulcrumed at its center upon a bolt 16 rigid with the frame.

A third and middle arm of each rocker comprises a pair of levers 20 pivoted at one end to one of the other rocker arms at equal distances from the fulcrum 16. The other end of each lever 20 is pivoted to one end of a connecting rod 18 the other end of which is pivoted to a crank 19 of a shaft 14 journaled in the frame. Each lever 20 consists of a relatively long part pivoted at its outer end to one of the rocker arms, an intermediate portion including an obtuse angle with the long part and a relatively short end including with the intermediate end on the opposite side an obtuse angle.

An elongated member 21 is guided for movement at right angles to arms 15 between a pair of members each affixed at one end to an arm and extending at right angles therefrom and disposed between the pair of levers carried by a rocker and has a longitudinal slot 22 slidably receiving the bolt 16 and carries at one end a fork 23 comprising a pair of diverging branches.

The free end of each branch is pivoted to a plate (Figs. 2, 3) slidable in a groove on the bent intermediate portion of a lever 20 and guiding same during the sliding motion. The end of member 21 projecting beyond the rocker carries a pin 24 slidable in an arcuate slot 25 formed in the frame.

The engine of Figs. 1–3 includes other units of the type described.

Fig. 1 shows engine in one of two extreme positions in which the two cranks and connecting rods are slightly off dead center position. Each member 21 has its pin 24 on the line passing through the fulcrums 16. Therefore each plate at the end of one of the branches constituting fork 23 is near the bend connecting the longer portion of a lever 20 to the intermediate bent portion on which the plate slides and which it guides. In the extreme position the crank-connected ends of lever 20 are close to one another and during the subsequent rocking of the rocker are moved apart by the movement of member 21.

The rotation of the two shafts by another unit of the engine (not shown) and including cranks in positions substantially displaced from the cranks of the unit shown, may displace the cranks of the engine illustrated to the firing position for the lower cylinder. This firing position is about 20° off dead center. The two rockers swing with their upper arms toward one another and with their lower arms away from one another.

The swinging of the rockers causes the pins 24 to approach the line through shafts 16 and the members 21 to slide on their bolts toward one another. The movement of the branch plates along the inclined intermediate lever portions toward the cranks causes the crank-joined end of the levers 21 to move apart to the position of Fig. 3. When the two pins 24 move above the fulcrum line, the two levers of each rocker move toward one another to a position in which the two middle rocker arms are inclined downwardly and toward one another, and the cranks have again passed dead center.

In the modication of Fig. 4 numeral 12 denotes a piston rod pivoted at its upper end (not shown) to a piston (not shown) movable in a cylinder rigid with a frame (both not shown). The lower end of the piston rod is pivoted to one end of a lever 20 constituting part of a rocker 17 and fulcrumed at one end to a frame part 35. Lever 20 resembles the levers 20 of Figs. 1–3 in that the portion adjacent the piston rod has two bends between which lies an intermediate portion inclined to the longer lever portion and a shortest lever portion is pivoted to the piston rod.

The lever portion between the bends is grooved and guided by a plate in the groove and pivoted to an angular end portion of a member 31. The same is provided with a longitudinal slot 22 for fulcrum bolt 16 rigid with the frame. The other end of member 21 carries a pin 24 guided in an arcuate cam slot formed in the frame. Member 31 is lengthwise guided in a longitudinal groove of a rocker arm fulcrumed on bolt 16 and pivoted at the other end to a connecting rod 18 pivoted to a crank of shaft 14 journaled in the frame.

During operation the outward stroke of the piston (not shown) causes the rod 18 thereof to swing lever 20 counterclockwise about its fulcrum on plate 15 fixed to the frame. The plate on the left hand end of member 21 is slidable lengthwise of the intermediate portion of lever 20 between the lower ends thereof and transmits the swing of lever 20 to member 21 which in turn owing to its sliding connection with a rocker arm, swings the latter about its fulcrum 16 fixed on the frame. During operation member 21, whose right hand end is guided in stationary groove 25, changes the distance between the adjacent ends of lever 20 and the rocker arm. During counterclockwise swing of lever 20 and the rocker arm the stated distance is first lengthened and then shortened. The reverse variation of the distance occurs during clockwise swing of lever 20 and the rocker arm.

It is to be understood that the foregoing description and the drawings are mere illustration, not limitations of my invention and that changes and modifications may without invention be resorted to without departing from the spirit of the invention as long as they fall within the scope of the appended claims.

What I claim is:

1. In a fluid pressure engine the combination comprising a frame, at least a cylinder rigid with the frame, at least a piston slidable in the cylinder, at least a piston rod pivoted to the piston, at least a shaft journaled in the frame and having a crank, a connecting rod pivoted to the crank, rocker means connecting the piston rod and connecting rod and including at least a lever operatively fulcrumed on the frame, a member guiding the lever, a rocker arm fulcrumed on the frame and guiding the member lengthwise in motion colinear with its length and pivoted to the connecting rod, and cam means on the frame guiding the member.

2. In a fluid pressure engine the combination comprising a frame, at least a pair of pistons each slidable relative to the frame and along parallel paths, piston rods each pivoted to a piston, a pair of rockers for each pair of pistons and fulcrumed to the frame and including oppositely directed arms each pivoted to a piston rod, middle arms each for a rocker and each comprising a pair of levers pivoted to a rocker, members each guided lengthwise by a rocker fulcrum and at right angles to its rocker and guiding a pair of levers on a rocker for movement toward and away from one another, and cam means each guiding a member.

3. In a fluid pressure engine the combination comprising a frame, a cylinder, a piston in the cylinder, a rod pivoted to the piston, a shaft journaled in the frame and having a crank, a connecting rod pivoted to the crank, a rocker connecting the piston rod to the connecting rod and including a lever pivoted to the piston rod and fulcrumed to the frame, a member guiding the lever, a bolt received by the member for relative motion, a rocker arm fulcrumed on the bolt and guiding the member lengthwise and colinear with its length, and cam means on the frame guiding the member.

4. In a fluid pressure engine the combination comprising a frame, at least one piston slidable relative to the frame, a rod pivoted to the piston, a shaft journaled in the frame and having a crank, rocker means rockably mounted on the frame and including a pair of elements one of which is pivoted to the piston rod and the other of which is operatively pivoted to the crank, a member guided by one of the elements and guiding the other element to vary the distance between the two elements and cam means guiding the member.

5. A mechanism for converting reciprocating or oscillating motion into rotary motion, a frame, a rod having one end movable along a straight line in the frame, a lever operatively pivoted at one end to the rod and including an intermediate portion forming obtuse angles with the remaining portions, the lever being operatively fulcrumed on the frame, a plate guiding the intermediate lever portion, a member having an end portion extending transversely of the remaining portion and pivoted at the outer end to the plate, the remaining member portion being slotted, a bolt in the frame and received in the slot, a straight rocker arm fulcrumed on the bolt and guiding the member in partial lengthwise alignment, a shaft journaled in the frame and having a crank pivoted to the free end of the rocker arm, and cam means guiding the member.

6. The mechanism according to claim 5 and wherein the intermediate lever portion is slotted and the slot receives the plate.

ERNEST ZECHER.

References Cited in the file of this patent

UNITED STATES PATENTS

| Number | Name | Date |
| --- | --- | --- |
| 529,339 | Stone | Nov. 13, 1894 |
| 553,581 | Gillett | Jan. 28, 1896 |
| 861,205 | Crane | July 23, 1907 |
| 1,168,116 | Scharf | Jan. 11, 1916 |
| 1,506,626 | Freer | Aug. 26, 1924 |
| 1,522,504 | Fabian | Jan. 13, 1925 |
| 1,932,562 | Kline | Nov. 17, 1931 |